US012344987B2

(12) United States Patent
Hoffman et al.

(10) Patent No.: US 12,344,987 B2
(45) **Date of Patent: *Jul. 1, 2025**

(54) DRYING RACK FOR A LAUNDRY TREATING APPLIANCE

(71) Applicant: WHIRLPOOL CORPORATION, Benton Harbor, MI (US)

(72) Inventors: Robert C. Hoffman, Coloma, MI (US); Jason R. Spears, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 386 days.

This patent is subject to a terminal disclaimer.

(21) Appl. No.: 17/854,910

(22) Filed: Jun. 30, 2022

(65) Prior Publication Data

US 2022/0333292 A1 Oct. 20, 2022

Related U.S. Application Data

(63) Continuation of application No. 16/927,244, filed on Jul. 13, 2020, now Pat. No. 11,414,809, which is a continuation of application No. 16/015,339, filed on Jun. 22, 2018, now Pat. No. 10,731,288.

(60) Provisional application No. 62/572,797, filed on Oct. 16, 2017.

(51) Int. Cl.

*D06F 58/04* (2006.01)
*D06F 58/18* (2006.01)
*F26B 11/02* (2006.01)
*D06F 39/14* (2006.01)

(52) U.S. Cl.

CPC .............. *D06F 58/04* (2013.01); *D06F 58/18* (2013.01); *F26B 11/02* (2013.01); *D06F 39/14* (2013.01)

(58) Field of Classification Search

CPC .......... D06F 58/04; D06F 58/18; D06F 39/14; F26B 11/02; A01M 23/18
USPC ...................................... 34/184; 16/262, 268
See application file for complete search history.

(56) References Cited

U.S. PATENT DOCUMENTS 2,513,806 A 7/1950 Kennedy
3,344,532 A 10/1967 Bigler
4,091,548 A * 5/1978 Daily ...................... D06F 58/04 34/202
6,385,862 B1 5/2002 Vande Haar
8,631,586 B2 1/2014 Leroy
10,895,034 B2 * 1/2021 Cho ........................ D06F 58/06
2010/0281925 A1 11/2010 Gokceimam et al.
2012/0211453 A1 8/2012 Stegerwald et al.
2013/0174434 A1 7/2013 James et al.
2016/0160424 A1 6/2016 Kim et al.
(Continued)

FOREIGN PATENT DOCUMENTS

EP 1522625 A1 4/2005
EP 2712953 A1 4/2014
(Continued)

*Primary Examiner* — John P McCormack
(74) *Attorney, Agent, or Firm* — McGarry Bair PC

(57) ABSTRACT

A laundry treating apparatus, such as a clothes dryer, includes an auxiliary drying rack configured to retain laundry items in a space between the drying rack and a door. The drying rack can be defined by a plurality of rods that are spaced such that laundry items are retained in the drying rack. The drying rack is designed to be easily opened and closed.

19 Claims, 16 Drawing Sheets

(56) References Cited

U.S. PATENT DOCUMENTS

| | | | |
|---|---|---|---|
| 2017/0254012 | A1 | 9/2017 | Barre et al. |
| 2019/0368114 | A1 | 12/2019 | Lee et al. |

FOREIGN PATENT DOCUMENTS

| | | | |
|---|---|---|---|
| KR | 100585699 | B1 | 6/2006 |
| WO | 0039383 | A1 | 7/2000 |
| WO | 13064578 | A1 | 5/2013 |

* cited by examiner

DRYING RACK FOR A LAUNDRY TREATING APPLIANCE

CROSS-REFERENCE TO RELATED APPLICATION(S)

This application is a continuation application of U.S. patent application Ser. No. 16/927,244, filed Jul. 13, 2020, now U.S. U.S. Pat. No. 11,414,809, issued Aug. 16, 2022, which is a continuation of U.S. patent application Ser. No. 16/015,339, filed Jun. 22, 2018, now U.S. Pat. No. 10,731, 288, issued Aug. 4, 2020, which claims the benefit of U.S. Provisional Patent Application No. 62/572,797, filed Oct. 16, 2017, all of which are hereby incorporated herein by reference in their entirety.

BACKGROUND OF THE INVENTION

Laundry treating appliances, such as clothes washers, clothes dryers, and refreshers, may have a configuration based on a rotating drum that defines a treating chamber in which laundry items are placed for treating according to a cycle of operation. The clothes dryer may include a cabinet defined by a front wall, a rear wall, and a pair of side walls supporting a top wall. A door may be hingedly mounted to the front wall and may be selectively movable between opened and closed positions to close an opening in the front wall, which provides access to the treating chamber within the cabinet.

Often times, delicate laundry items are not able to withstand forces from within the treating chamber during a cycle of operation and must be dried outside of a clothes dryer. Forces from within the treating chamber can be a result of the cycle of operation or from other laundry items within the chamber. For example, laundry items having straps can intertwine with other laundry items and can cause wear or damage. In another example, items having holes or delicate fabrics can be prone to ripping if they become tangled with other laundry items.

SUMMARY

One aspect of the disclosure is a laundry treating appliance comprising a cabinet having an interior and defined by a front wall, a rear wall, and a pair of side walls supporting a top wall, a rotatable drum disposed within the interior of the cabinet that defines a treating chamber, a door mounted vertically to the front wall and selectively moveable between open and closed positions to close an opening in the front wall and having an outer surface and an inner surface where the inner surface faces the treating chamber in the closed position, and a drying rack mounted vertically to the inner surface of the door and having an open position and a closed position and extending toward the treating chamber. The drying rack comprises a plurality of rods defining the drying rack, a hinge positioned on one end of the drying rack for allowing the drying rack to be selectively moveable between open and closed positions, and a latch positioned an end of the drying rack opposite the hinge and selectively coupling the drying rack to the door.

Another aspect of the disclosure is a laundry treating appliance, comprising a cabinet having an interior and defined by a front wall, a rear wall, and a pair of side walls supporting a top wall, a rotatable drum disposed within the interior of the cabinet that defines a treating chamber, a door mounted to the front wall and selectively moveable between an open and closed position to close an opening in the front wall and having an outer surface and an inner surface where the inner surface faces the treating chamber in the closed position, and a drying rack defined by a plurality of rods and mounted to the inner surface of the door and selectively moveable by a hinge between an open position for receiving laundry items and a closed position for retaining laundry items in the drying rack during a cycle of operation and having an outer surface extending into the treating chamber when the door is in the closed position.

DESCRIPTION OF EMBODIMENTS OF THE INVENTION

While this description will reference many different features for a laundry treating appliance, one beneficial and advantageous feature is a removable, vertical drying rack that allows a consumer to dry unique and delicate items while simultaneously drying a standard clothes load. Another advantageous feature is the location of the vertical rack in the front of the unit, making loading and unloading of the vertical rack ergonomic. Additionally, the vertical rack allows the consumer to expose items placed in the rack to the heated air, allowing the items to dry more evenly and consistently.

Figure 1A:
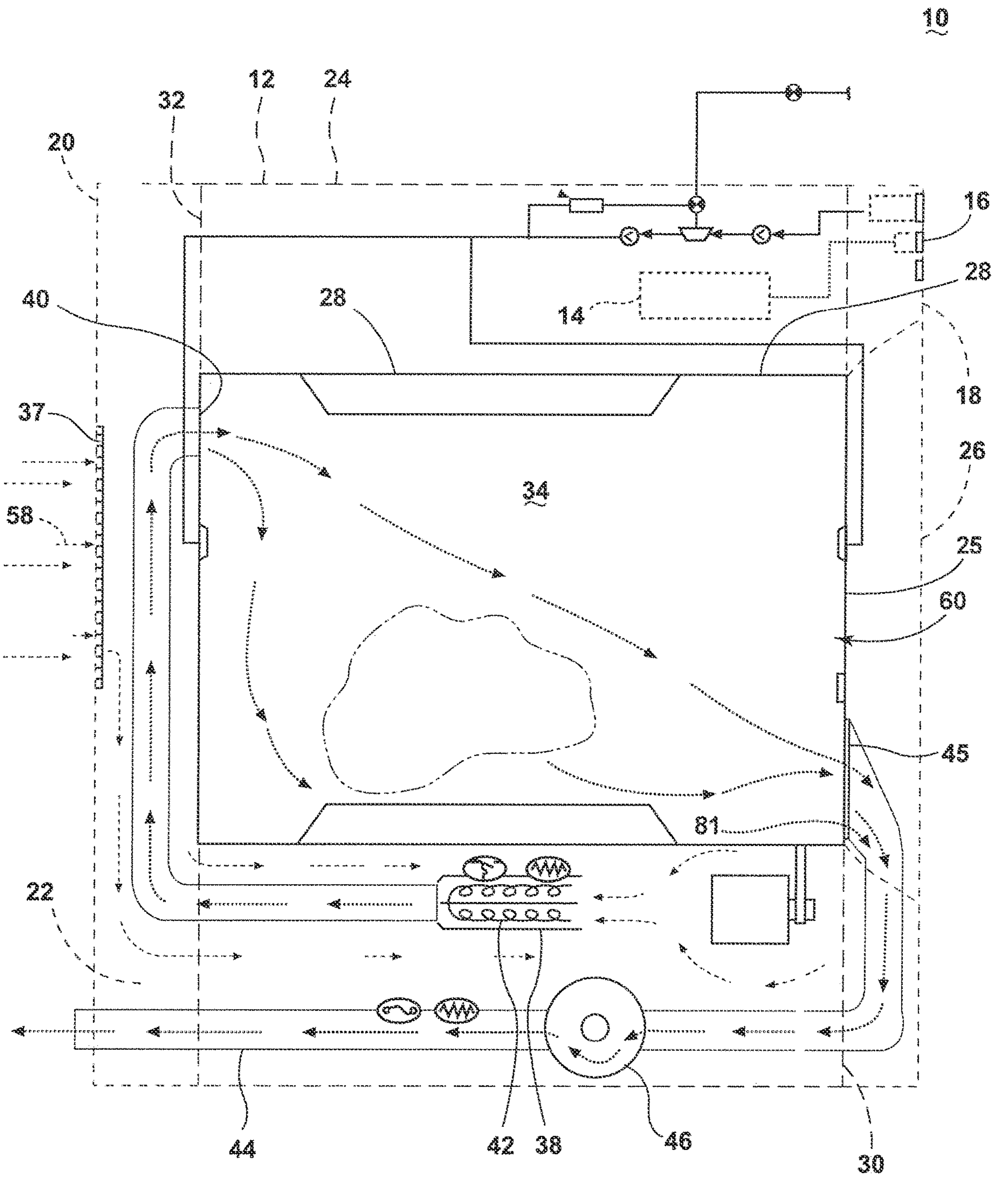
FIG. 1A is a schematic view of a laundry treating appliance in the form of a clothes dryer.
Figure 1B:
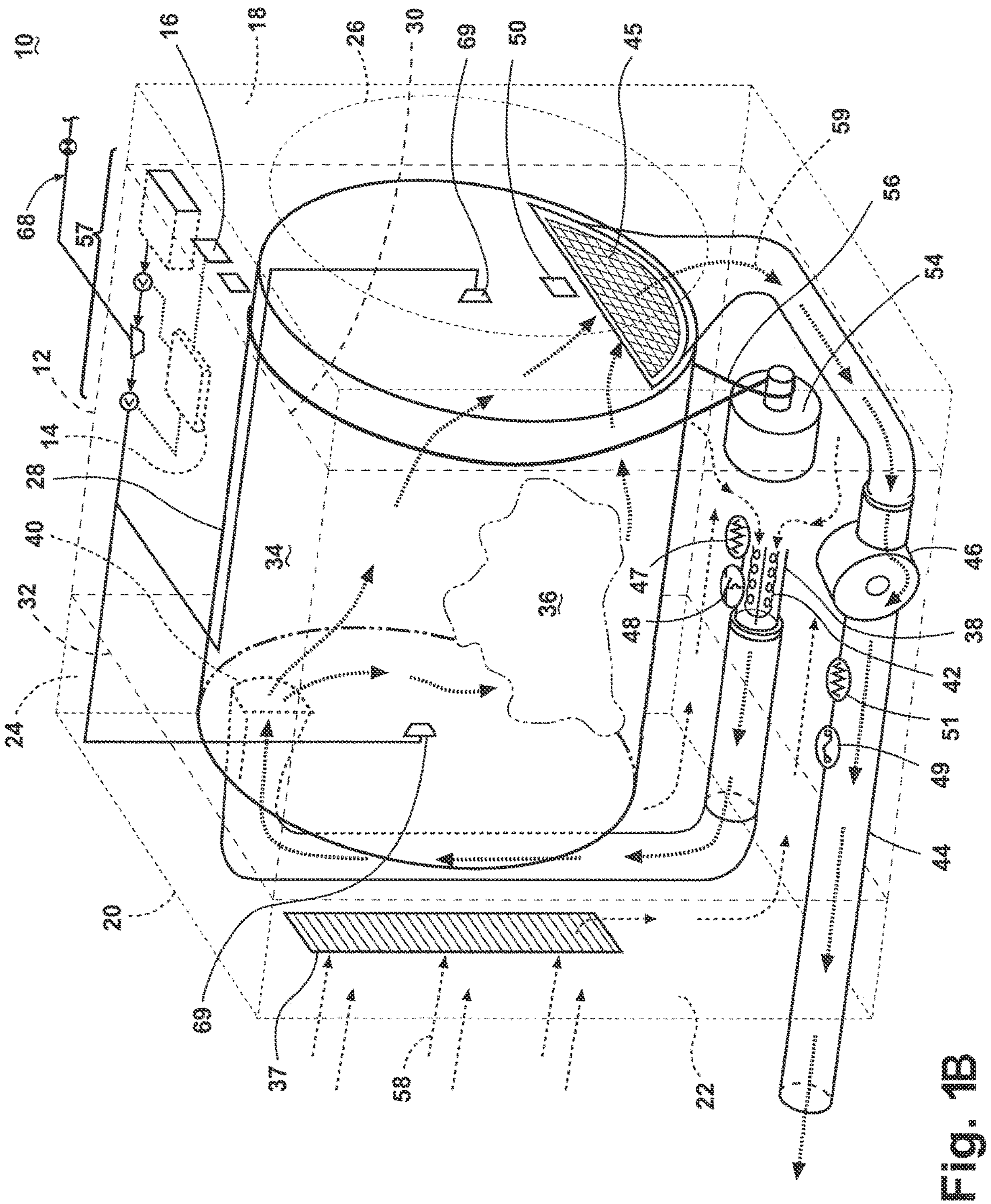
FIG. 1B is a schematic, perspective view of the laundry treating appliance of FIG. 1A.

Referring to FIG. 1A and FIG. 1B, a laundry treating appliance 10 in the form of a clothes dryer 10 is illustrated that may be controlled according to aspects described herein. The clothes dryer 10 described herein shares many features of a traditional automatic clothes dryer, which will not be described in detail except as necessary for a complete understanding of the invention. While the embodiments of the invention are described in the context of a clothes dryer 10, aspects described herein may be used with any type of laundry treating appliance, non-limiting examples of which include a washing machine, a combination washing machine and dryer and a refreshing/revitalizing machine.

As illustrated in FIG. 1A and FIG. 1B, the clothes dryer 10 may include a cabinet 12 in which is provided a controller 14 that may receive input from a user through a user interface 16 for selecting a cycle of operation and controlling the operation of the clothes dryer 10 to implement the selected cycle of operation.

The cabinet 12 may be defined by a front wall 18, a rear wall 20, and a pair of side walls 22 supporting a top wall 24. A chassis may be provided with the walls being panels mounted to the chassis. A door 26 may be hingedly mounted to the front wall 18 and may be selectively movable between opened and closed positions to close an opening in the front wall 18, which provides access to the interior of the cabinet 12.

A rotatable drum 28 may be disposed within the interior of the cabinet 12 between opposing stationary front and rear bulkheads 30, 32, which, along with the door 26, collectively define a treating chamber 34 for treating laundry. As illustrated, and as is the case with most clothes dryers, the treating chamber 34 is not fluidly coupled to a drain. Thus, any liquid introduced into the treating chamber 34 may not be removed merely by draining.

Non-limiting examples of laundry that may be treated according to a cycle of operation include, a hat, a scarf, a glove, a sweater, a blouse, a shirt, a pair of shorts, a dress, a sock, a pair of pants, a shoe, an undergarment, and a jacket. Furthermore, textile fabrics in other products, such as draperies, sheets, towels, pillows, and stuffed fabric articles (e.g., toys), may be treated in the clothes dryer 10.

The drum 28 may include at least one lifter. In most dryers, there may be multiple lifters. The lifters may be located along an inner surface of the drum 28 defining an interior circumference of the drum 28. The lifters may facilitate movement of the laundry 36 within the drum 28 as the drum 28 rotates.

The drum 28 may be operably coupled with a motor 54 to selectively rotate the drum 28 during a cycle of operation. The coupling of the motor 54 to the drum 28 may be direct or indirect. As illustrated, an indirect coupling may include a belt 56 coupling an output shaft of the motor 54 to a wheel/pulley on the drum 28. A direct coupling may include the output shaft of the motor 54 coupled to a hub of the drum 28.

An air system may be provided to the clothes dryer 10. The air system supplies air to the treating chamber 34 and exhausts air from the treating chamber 34. The supplied air may be heated or not. The air system may have an air supply portion that may form, in part, a supply conduit 38, which has one end open to ambient air via a rear vent 37 and another end fluidly coupled to an inlet grill 40, which may be in fluid communication with the treating chamber 34. A heating element 42 may lie within the supply conduit 38 and may be operably coupled to and controlled by the controller 14. If the heating element 42 is turned on, the supplied air will be heated prior to entering the drum 28.

The air system may further include an air exhaust portion that may be formed in part by an exhaust conduit 44. A lint trap 45 may be provided as the inlet from the treating chamber 34 to the exhaust conduit 44. A blower 46 may be fluidly coupled to the exhaust conduit 44. The blower 46 may be operably coupled to and controlled by the controller 14. Operation of the blower 46 draws air into the treating chamber 34 as well as exhausts air from the treating chamber 34 through the exhaust conduit 44. The exhaust conduit 44 may be fluidly coupled with a household exhaust duct (not shown) for exhausting the air from the treating chamber 34 to the outside of the clothes dryer 10.

The air system may further include various sensors and other components, such as a thermistor 47 and a thermostat 48, which may be coupled to the supply conduit 38 in which the heating element 42 may be positioned. The thermistor 47 and the thermostat 48 may be operably coupled to each other. Alternatively, the thermistor 47 may be coupled to the supply conduit 38 at or near to the inlet grill 40. Regardless of its location, the thermistor 47 may be used to aid in determining an inlet temperature. A thermistor 51 and a thermal fuse 49 may be coupled to the exhaust conduit 44, with the thermistor 51 being used to determine an outlet air temperature.

A moisture sensor 50 may be positioned in the interior of the treating chamber 34 to monitor the amount of moisture of the laundry in the treating chamber 34. One example of a moisture sensor 50 is a conductivity strip. The moisture sensor 50 may be operably coupled to the controller 14 such that the controller 14 receives output from the moisture sensor 50. The moisture sensor 50 may be mounted at any location in the interior of the clothes dryer 10 such that the moisture sensor 50 may be able to accurately sense the moisture content of the laundry. For example, the moisture sensor 50 may be coupled to one of the bulkheads 30, 32 of the drying chamber 34 by any suitable means.

A dispensing system 57 may be provided to the clothes dryer 10 to dispense one or more treating chemistries to the treating chamber 34 according to a cycle of operation. As illustrated, the dispensing system 57 may be located in the interior of the cabinet 12 although other locations are also possible. The dispensing system 57 may be fluidly coupled to a water supply 68. The dispensing system 57 may be further coupled to the treating chamber 34 through one or more nozzles 69. As illustrated, nozzles 69 are provided to the front and rear of the treating chamber 34 to provide the treating chemistry or liquid to the interior of the treating chamber 34, although other configurations are also possible.

As illustrated, the dispensing system 57 may include a reservoir 60, which may be a cartridge, for a treating chemistry that is releasably coupled to the dispensing system 57, which dispenses the treating chemistry from the reservoir 60 to the treating chamber 34. The reservoir 60 may include one or more cartridges configured to store one or more treating chemistries in the interior of cartridges.

A mixing chamber 62 may be provided to couple the reservoir 60 to the treating chamber 34 through a supply conduit 63. Pumps such as a metering pump 64 and delivery pump 66 may be provided to the dispensing system 57 to selectively supply a treating chemistry and/or liquid to the treating chamber 34 according to a cycle of operation. The water supply 68 may be fluidly coupled to the mixing chamber 62 to provide water from the water source to the mixing chamber 62. The water supply 68 may include an inlet valve 70 and a water supply conduit 72. It is noted that, instead of water, a different treating chemistry may be provided from the exterior of the clothes dryer 10 to the mixing chamber 62.

The treating chemistry may be any type of aid for treating laundry, non-limiting examples of which include, but are not limited to, water, fabric softeners, sanitizing agents, de-wrinkling or anti-wrinkling agents, and chemicals for imparting desired properties to the laundry, including stain resistance, fragrance (e.g., perfumes), insect repellency, and UV protection.

The clothes dryer 10 may also be provided with a steam generating system 80 which may be separate from the dispensing system 57 or integrated with portions of the dispensing system 57 for dispensing steam and/or liquid to the treating chamber 34 according to a cycle of operation. The steam generating system 80 may include a steam generator 82 fluidly coupled with the water supply 68 through a steam inlet conduit 84. A fluid control valve 85 may be used to control the flow of water from the water supply conduit 72 between the steam generating system 80 and the dispensing system 57. The steam generator 82 may further be fluidly coupled with the one or more supply conduits 63 through a steam supply conduit 86 to deliver steam to the treating chamber 34 through the nozzles 69. Alternatively, the steam generator 82 may be coupled with the treating chamber 34 through one or more conduits and nozzles independently of the dispensing system 57.

The steam generator 82 may be any type of device that converts the supplied liquid to steam. For example, the steam generator 82 may be a tank-type steam generator that stores a volume of liquid and heats the volume of liquid to convert the liquid to steam. Alternatively, the steam generator 82 may be an in-line steam generator that converts the liquid to steam as the liquid flows through the steam generator 82.

It will be understood that any suitable dispensing system and/or steam generating system may be used with the clothes dryer 10. It is also within the scope of the invention for the dryer 10 to not include a dispensing system or a steam generating system.

Figure 2A:
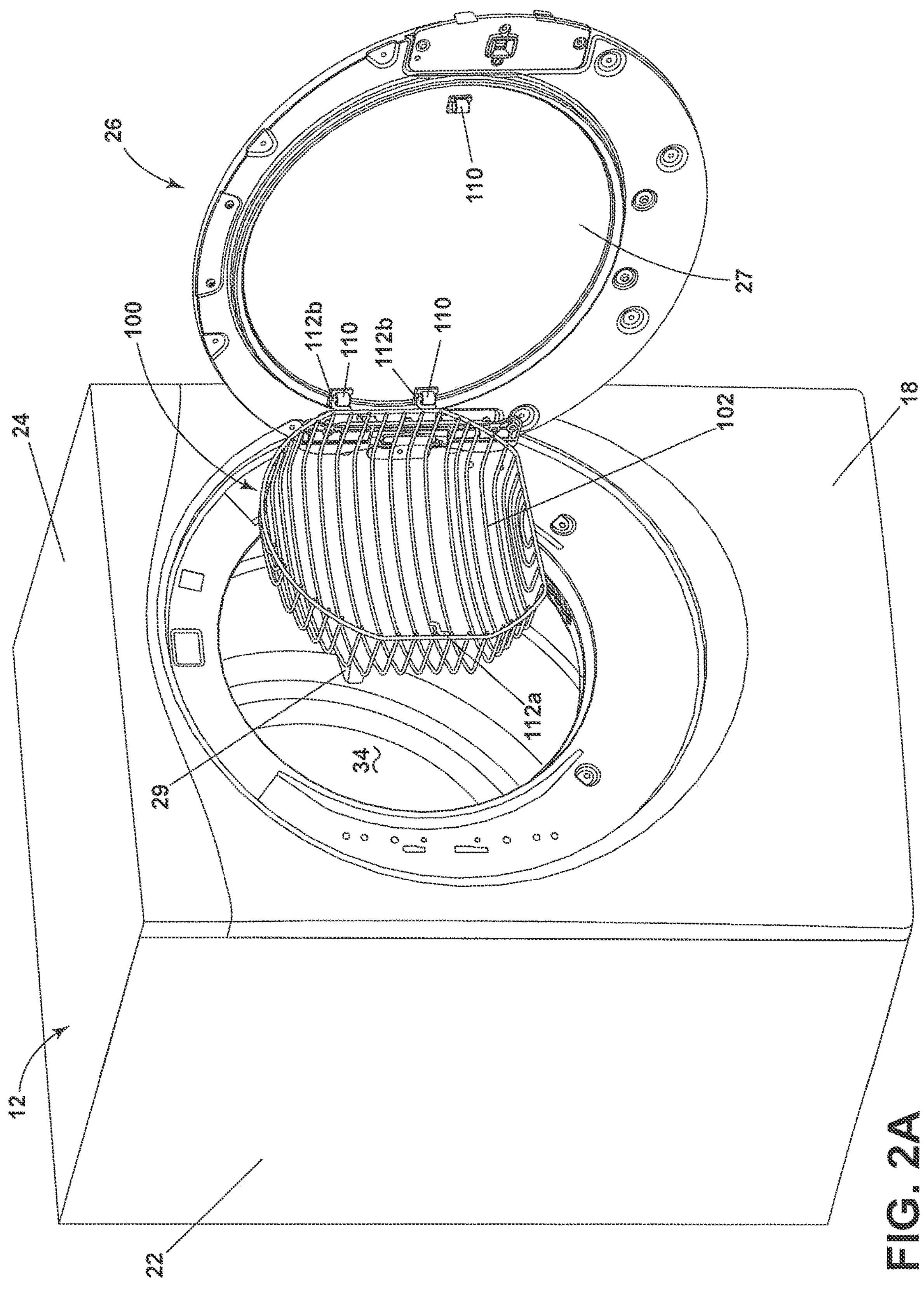
FIG. 2A is a perspective view of an auxiliary drying rack in an open position according to aspects described herein.

FIG. 2A is a perspective view of an auxiliary drying rack 100 coupled with the door 26 in an open position according to aspects described herein. The drying rack 100 includes spaced horizontal rods 102 that are arranged, or welded, to form the drying rack 100. The arrangement of rods 102 can define a dome shape that efficiently retains an amount of laundry items. The auxiliary drying rack 100 can extend towards the treating chamber 34 when the door 26 is in a closed position. The dome shape of auxiliary drying rack 100 can maximize capacity for laundry items while minimizing interference with laundry tumbling within the treating chamber 34. The rods 102 can be in the range of 4-5 millimeters (mm) in diameter and can be formed from any suitable material, such as a metal for use in clothes dryer 10. The rods 102 can be spaced appropriately such that laundry items can be retained in the drying rack and not pulled into the treating chamber 34 during a cycle of operation. Hinges can be in the form of bushings 110 mounted to a door glass 27 with an adhesive. The door glass 27 can be considered an inner surface of the door 26 that faces the treating chamber 34, while an outer surface of the door 26 does not face the treating chamber 34. In the case that the door 26 does not include a door glass 27, the bushings 110 can be mounted to the door 26 with any suitable fastener, such as screws and the like.

Figure 2B:
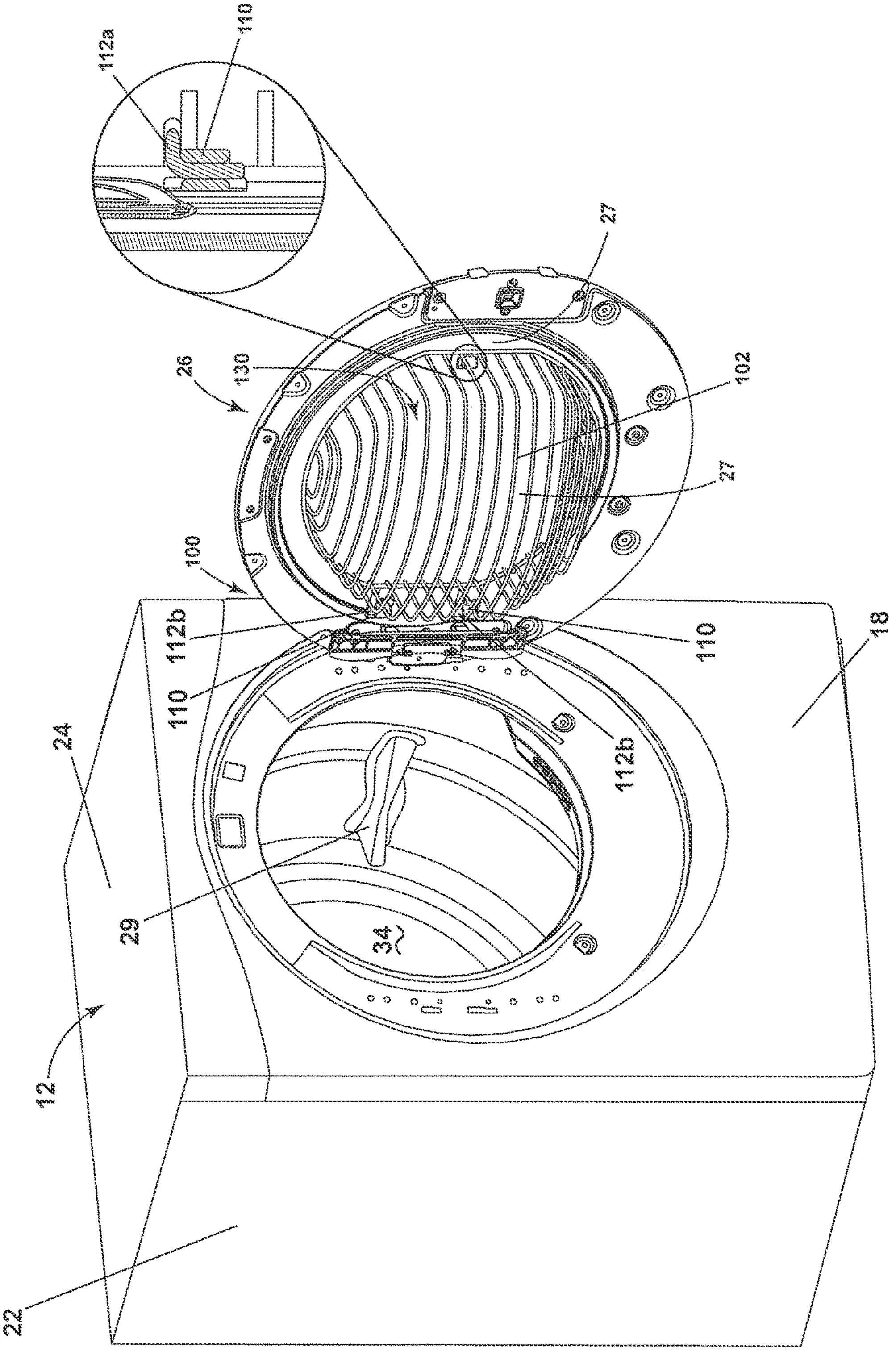
FIG. 2B is a perspective view of an auxiliary drying rack in a closed position according to aspects described herein.

Pins 112*a* and 112*b* coupled to the rods 102 can be received within the bushings 110 in order to couple the drying rack 100 to the door 26 via the hinges or bushings 110. As best seen in the enlarged portion of FIG. 2B, pin 112*a* can be shorter in length than pins 112*b* in order to facilitate the movement from the open to closed, or closed to open positions. When the drying rack 100 is in the closed position as seen in FIG. 2B, a space 130 is formed wherein laundry items can be retained.

In order to move the drying rack 100 from a closed position to an open position, a user simply lifts the drying rack 100 in the vertical direction such that pin 112*a* is removed from the bushing 110. Since pins 112*b* are longer than the pins 112*a*, pins 112*b* can be retained within the bushing 110 and the user can swing the drying rack 100 to the open position. If the user continues to lift the drying rack 100, the pins 112*b* can be removed from bushings 110 and the drying rack 100 can be completely decoupled from the door 26.

Figure 3A:
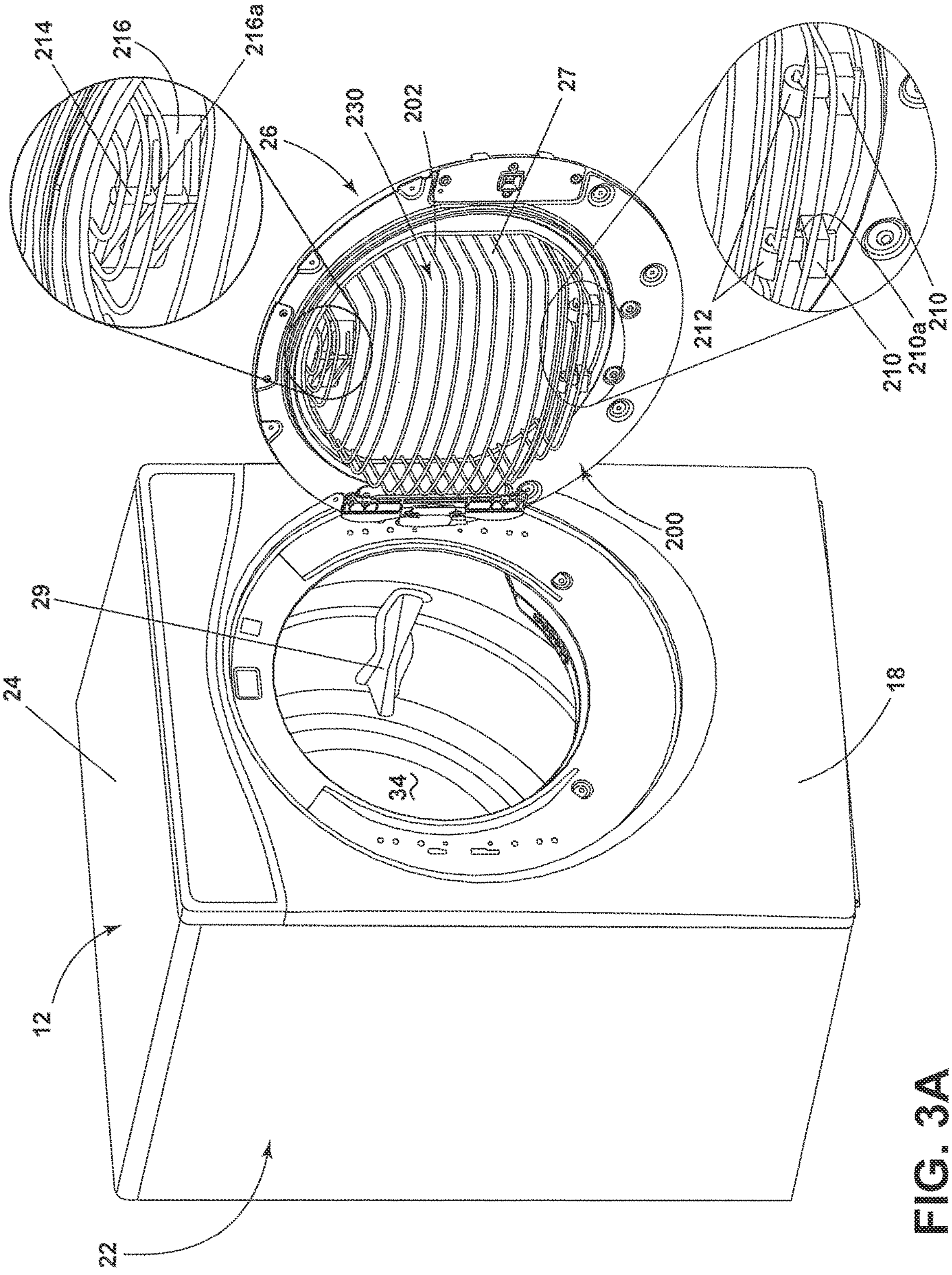
FIG. 3A is a perspective view of an auxiliary drying rack in an open position according to aspects described herein.

FIG. 3A illustrates an auxiliary drying rack 200 in a closed position according to aspects described herein. Since the auxiliary drying rack 200 is similar to the auxiliary drying rack 100; like parts will be identified with like numerals increased by 100, with it being understood that the description of the like parts of auxiliary drying rack 100 applies to the auxiliary drying rack 200 unless otherwise noted.

Drying rack 200 is similar to drying rack 100 and includes spaced horizontal rods 202. The drying rack 200 includes wedges 212 that are received within mounting pieces 210 in order to couple the drying rack 200 to the door 26. One end of the wedges 212 are configured to be rotationally coupled to the drying rack 200 to allow the drying rack 200 to move or rotate relative to the wedges. The other end of the wedges 212 are configured to be wedged and secured in the mounting pieces 210. The mounting pieces 210 can include a recess 210*a* that removably receives or allows the wedges 212 to be wedged into the recess 210*a* for a tight fit. The mounting pieces 210 can be adhered, mounted, or otherwise secured to the door 26. Alternatively, the wedges 212 and mounting pieces 210 can be pins and bushings similarly to drying rack 100 but in a rotated position such that the pins can slide in and out of the bushings in a horizontal direction, as a opposed to a vertical direction.

Figure 3B:
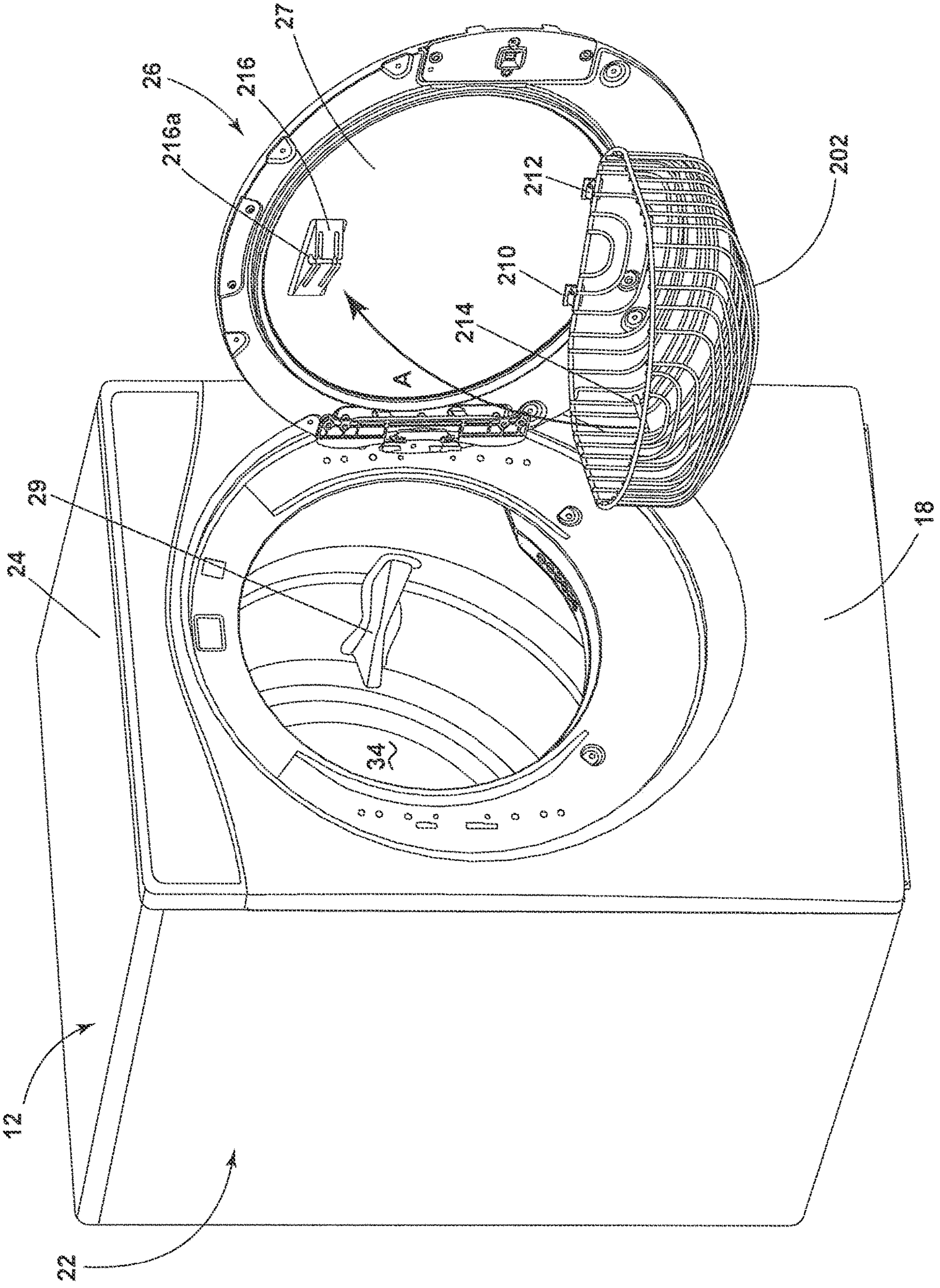
FIG. 3B is a perspective view of an auxiliary drying rack in a closed position according to aspects described herein.

Turning to FIG. 3B, the drying rack 200 is in the open position. A closing structure 216 can receive a pin 214 on drying rack 200 in order to couple and close the drying rack to the door 26. The pin 214 generally snap engages the closing structure 216 to securely hold the drying rack 200 to the door 26 during operation. When the drying rack 200 is in the open position, a user can lift, or flip, the drying rack 200 upwards, as indicated by the arrow, A, and push the pin 214 into a recess 216*a* in the closing structure 216 such that the pin 214 is clasped by the recess 216*a* for a snap-fit to engage.

Figure 3C:
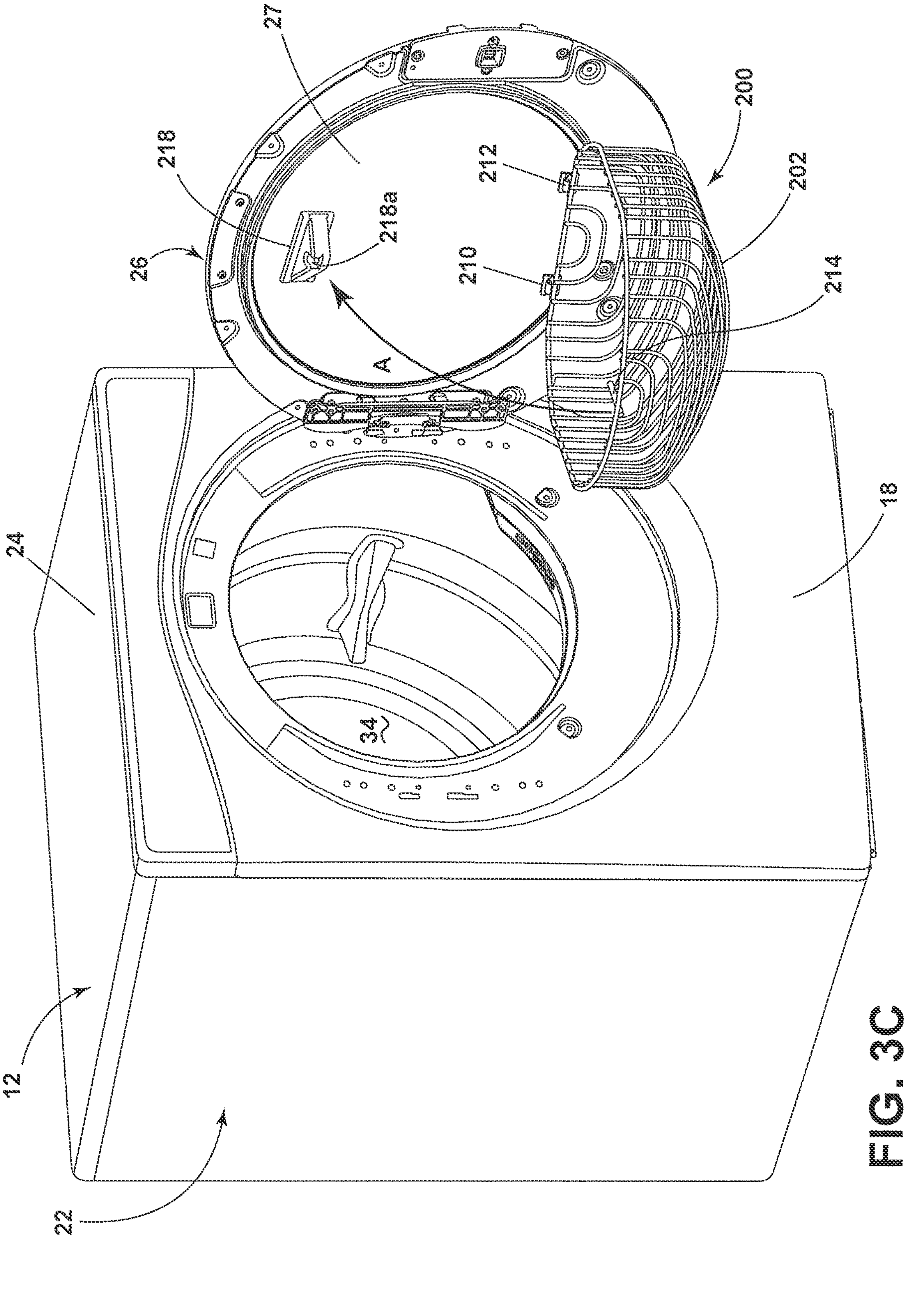
FIG. 3C is a perspective view of an auxiliary drying rack in an open position according to aspects described herein.

FIG. 3C illustrates drying rack 200 with a catch 218 rather than a closing structure 216. In this embodiment, a user can lift, or flip, the drying rack 200 in the direction of arrow A, while simultaneously lifting the drying rack 200 upwards, such that the pin 214 rises above the catch 218. The free end of the pin 214 can be positioned above the a recess 218*a* in the catch 218 in order for the pin 214 to be received within the recess 218*a* upon the user releasing or lowering the drying rack 200. The wedges 212 can slide upwards while the drying rack 200 is lifted upwards and are long enough such that the wedges 212 are retained within the mounting pieces 210 when the pin 214 is positioned above the catch 218. If the drying rack 200 is lifted far enough, the wedges 212 can be removed from the mounting pieces 210 to decouple the drying rack 200 from the door 26.

Figure 3D:
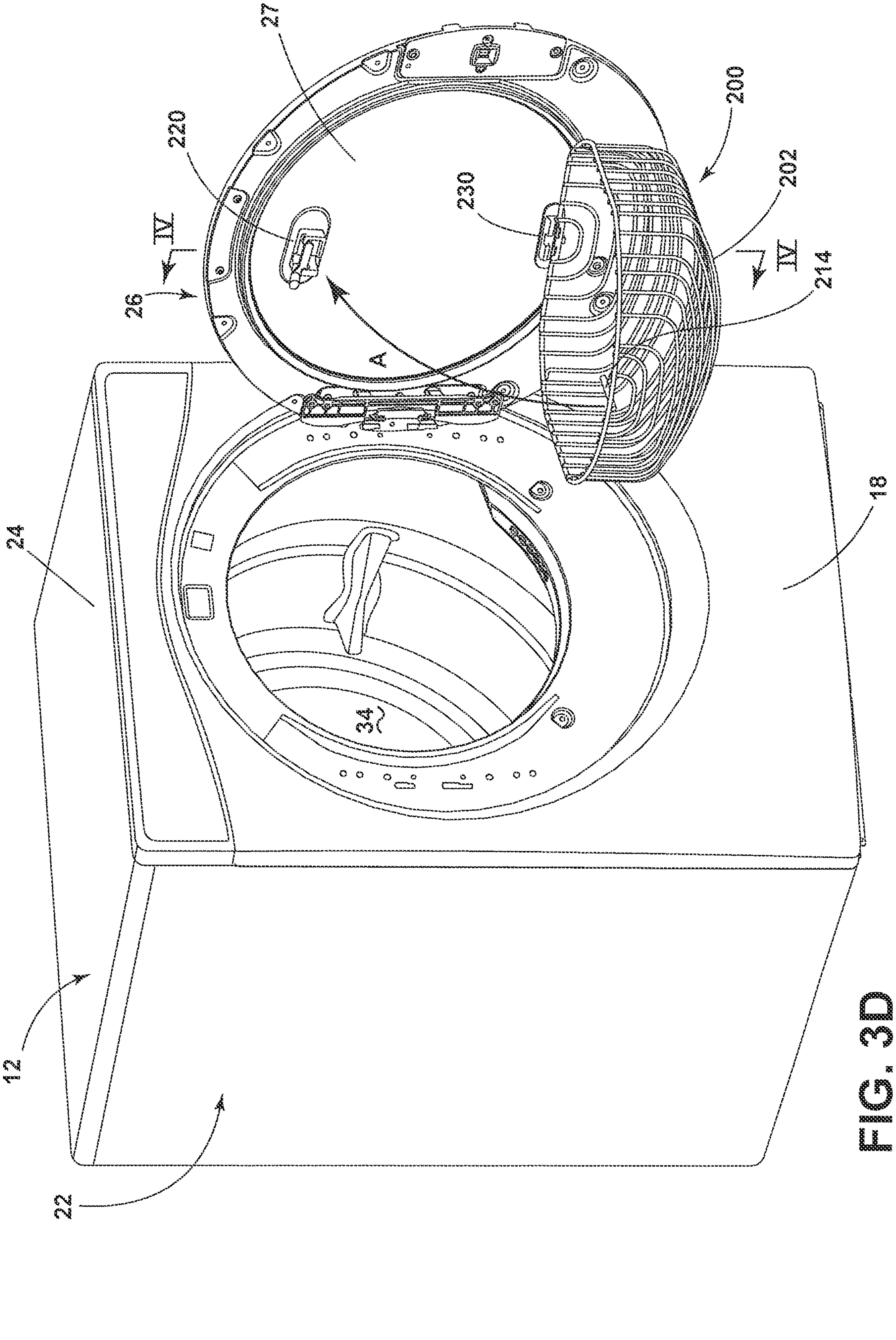
FIG. 3D is a perspective view of an auxiliary drying rack in an open position according to aspects described herein

FIG. 3D illustrates drying rack 200 with a latch 220 rather than the catch 218 or the closing structure 216 shown in FIGS. 3C and 3B. Furthermore the drying rack 200 includes a bottom hinge 230 rather than mounting pieces 210. The drying rack 200 is rotatably coupled to the bottom hinge 230 in order for a user to flip the drying rack 200 from the open position, towards the latch 220 for a user to lock the drying rack 200 into a closed position.

Figure 4B:
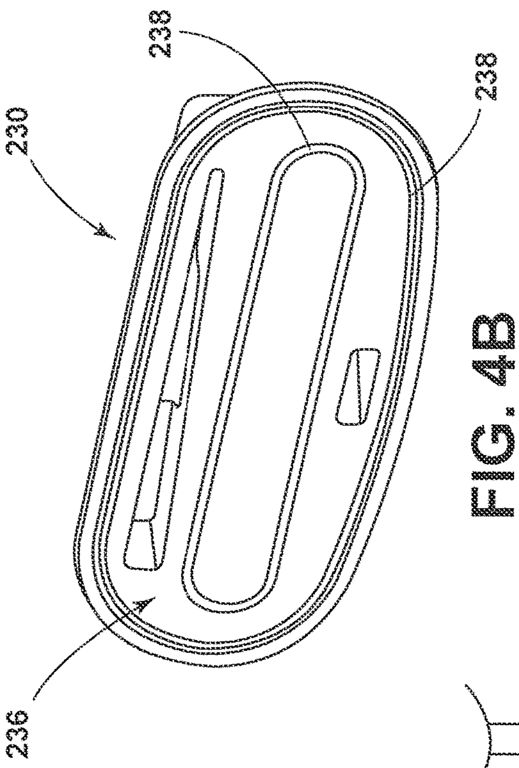
FIG. 4B is a rear view of the hinge of FIG. 4A.
Figure 4A:
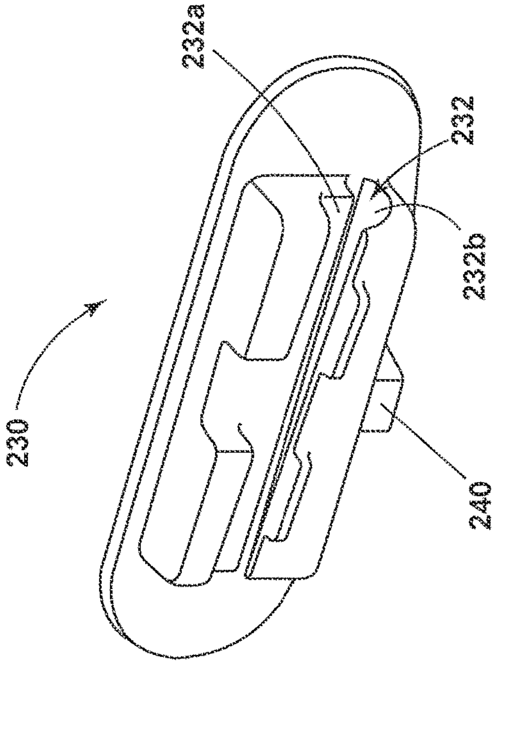
FIG. 4A is a perspective view of a bottom hinge for an auxiliary drying rack according to aspects described herein.

Turning to FIG. 4A, the bottom hinge 230 is more clearly illustrated. The bottom hinge 230 includes an L-shaped slot 232 to receive a bottom rod 234 of the drying rack 200. The bottom rod 234 can be inserted into a vertical portion 232*a* of the slot 232 where the bottom rod 234 can be moved down into a lower, horizontal portion 232*b* of the slot 232 to securely engage the drying rack 200 with the bottom hinge 230. The slot 232 can be angled to prevent inadvertent drying rack 200 disengagement from the door. A rack stop 240 is provided on the bottom hinge 230.

FIG. 4B illustrates a rear view of the bottom hinge 230. The bottom hinge 230 includes channels 238 on a rear surface 236. The bottom hinge 230 can be mounted to the door 26 with an adhesive applied to the rear surface 236. The channels 238 can prevent adhesive applied to the rear surface 236 from migrating outside of the bottom hinge 230 by allowing the adhesive to flow into the channels 238.

Figure 4C:
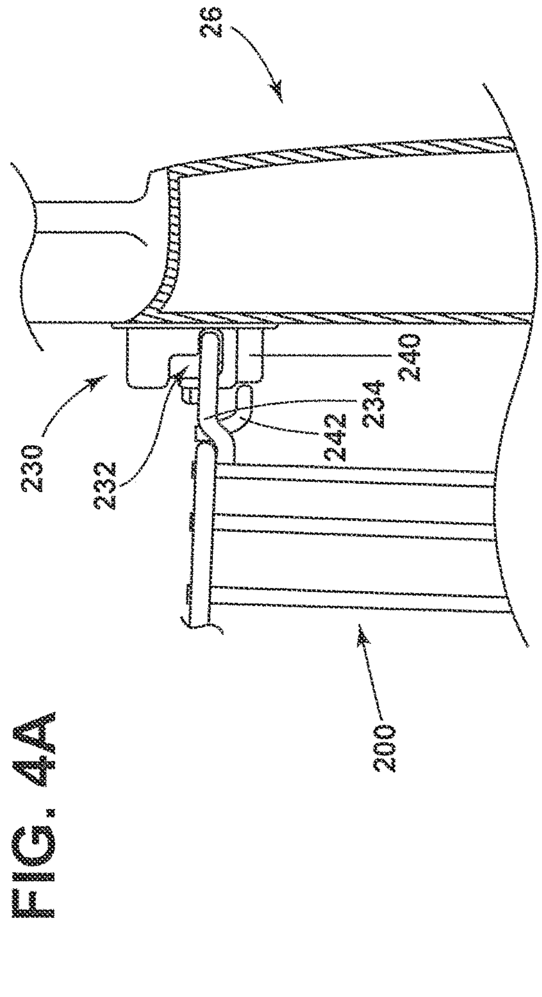
FIG. 4C is a cross-sectional view along ling IV-IV in FIG. 3D.

FIG. 4C more clearly illustrates the L-shaped slot 232 and the bottom rod 234 with the drying rack 200 in the open position. A protruding portion 242 of the drying rack 200 abuts the rack stop 240 when the drying rack 200 is in the open position in order to prevent the drying rack 200 from loosely hanging below horizontal. The angle that the drying rack 200 opens can be controlled to around 88 degrees, depending on the length of the protruding portion 242 or the rack stop 240.

Figure 5B:
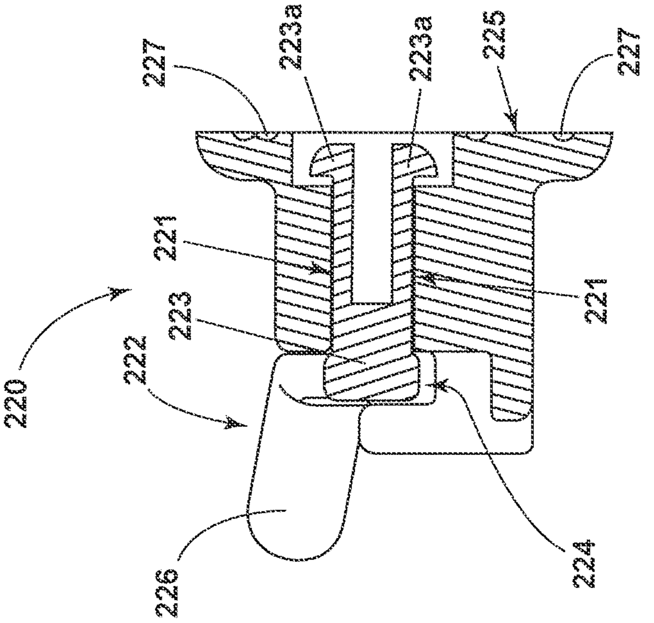
FIG. 5B is a cross-sectional view along line V-V in FIG. 5A.
Figure 5A:
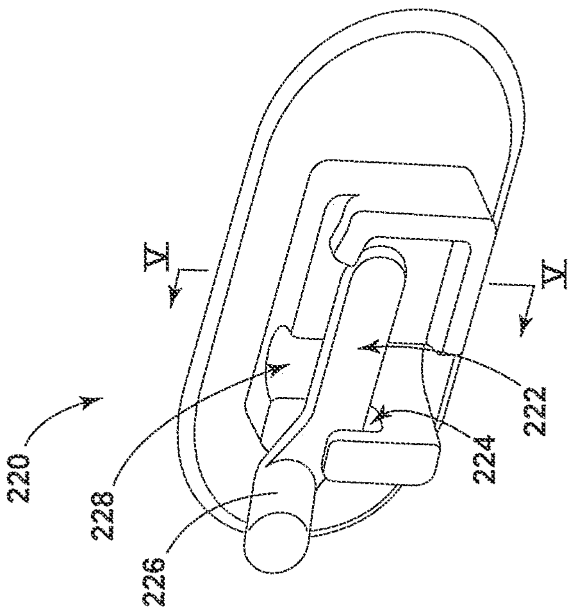
FIG. 5A is a perspective view of a latch for an auxiliary drying rack according to aspects described herein.

Turning to FIG. 5A, the latch 220 is more clearly illustrated. The latch 220 selectively couples the drying rack 200 to the door 26. The latch 220 includes a recessed portion 224 extending outwardly from the latch 220 and a lever 222 that is received within the recessed portion 224. The lever 222 can rotate in and out of the recessed portion 224 by a handle 226 such that when the lever 222 is within the recessed portion 224, the latch 220 is in the lock position. The pin 214 on the drying rack can be received in a depression 228 provided on the latch 220 behind the lever 222. Thus, when the pin 214 is received in the depression 228 and the lever 222 is in the lock position, the pin 215 is retained and the drying rack 200 is secured in a closed position.

FIG. 5B illustrates a cross-sectional view of line V-V in FIG. 5A showing a snap portion 223 of the lever 222. The snap portion 223 can be snapped in, or pushed into a slit 221 in the latch 220 in order to securely mount the lever 222 to the latch 220. The snap portion 223 includes barbs 223*a* to prevent the lever 222 from disengaging with the latch 220. Furthermore, a rear side 225 of the latch 220 can include containment channels 227 similar to channels 238 of the bottom hinge 230 to prevent adhesive applied to the rear side 225 from migrating outside when pressed against or adhered to the inner surface 27 of the door 26.

Figure 6:
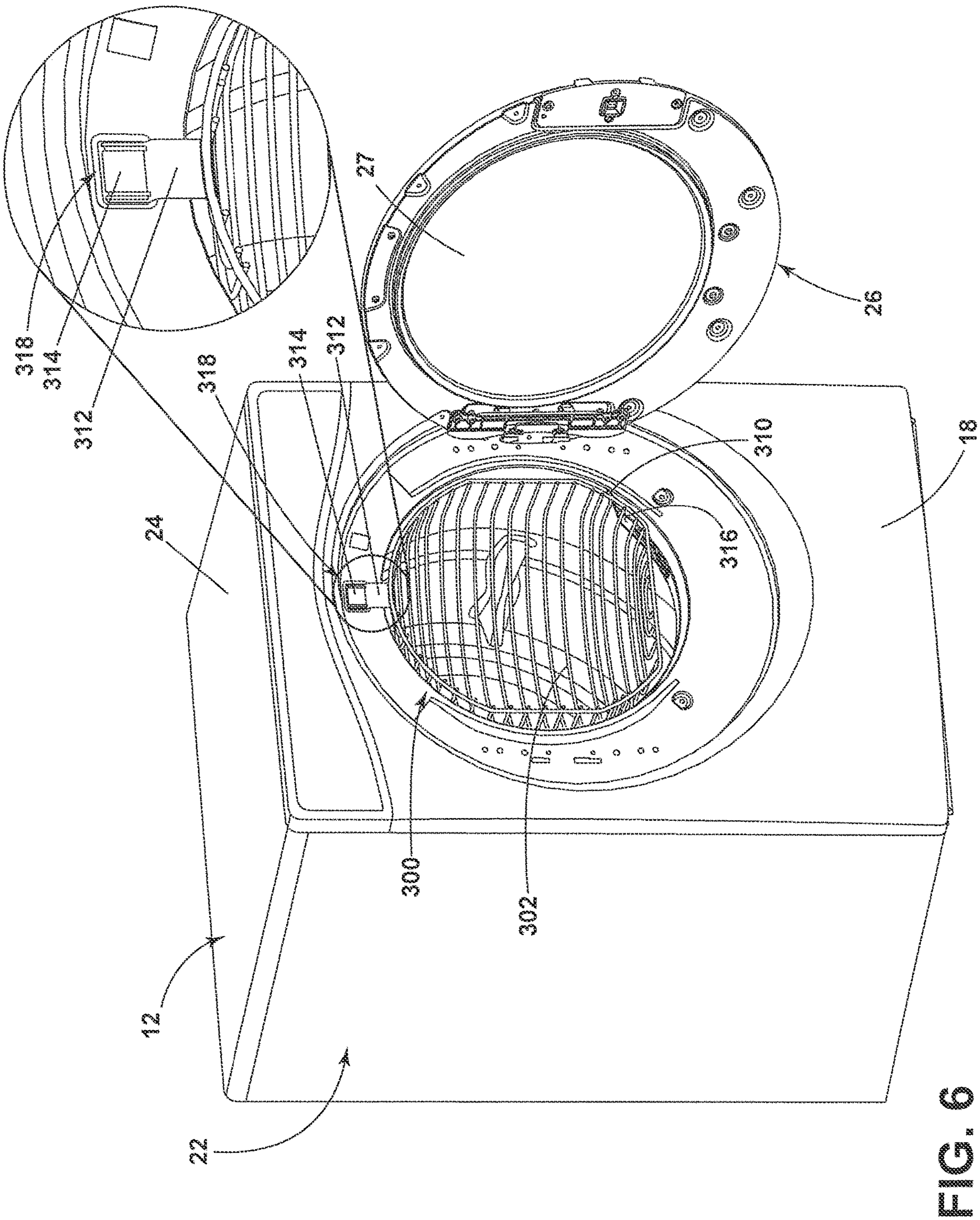
FIG. 6 is a perspective view of an auxiliary drying rack in an open position according to aspects described herein.

FIG. 6 illustrates an auxiliary drying rack 300 according to aspects described herein. Since the auxiliary drying rack 300 is similar to the auxiliary drying rack 100; like parts will be identified with like numerals increased by 200, with it being understood that the description of the like parts of auxiliary drying rack 100 applies to the auxiliary drying rack 300 unless otherwise noted.

The drying rack 300 is similar to drying rack 100 and includes spaced horizontal rods 302, except in this illustration, the drying rack 300 is mounted in the opening of the dryer and the door closes around the rack 300. At the lower perimeter of the drying rack 300, pegs, or pins 310 on the drying rack 300 can be received within holes in the outlet 316 of the cabinet 12 in order to couple the drying rack 300 to the cabinet 12. At the upper end of the drying rack 300, a bracket, or plate 312 can be coupled with the drying rack 300 that fits within a recess 318 on the front 18 of the cabinet 12 and can include a magnet 314 or other mounting attachment so that the plate 312 is attracted to the front 18 of the cabinet 12 and can be retained within the recess 318. A user can close the door 26 causing the door 26 to abut the plate 312 in order to hold the drying rack 300 in place by sealing or engaging the plate 312 between the front 18 and the door 26.

Figure 7:
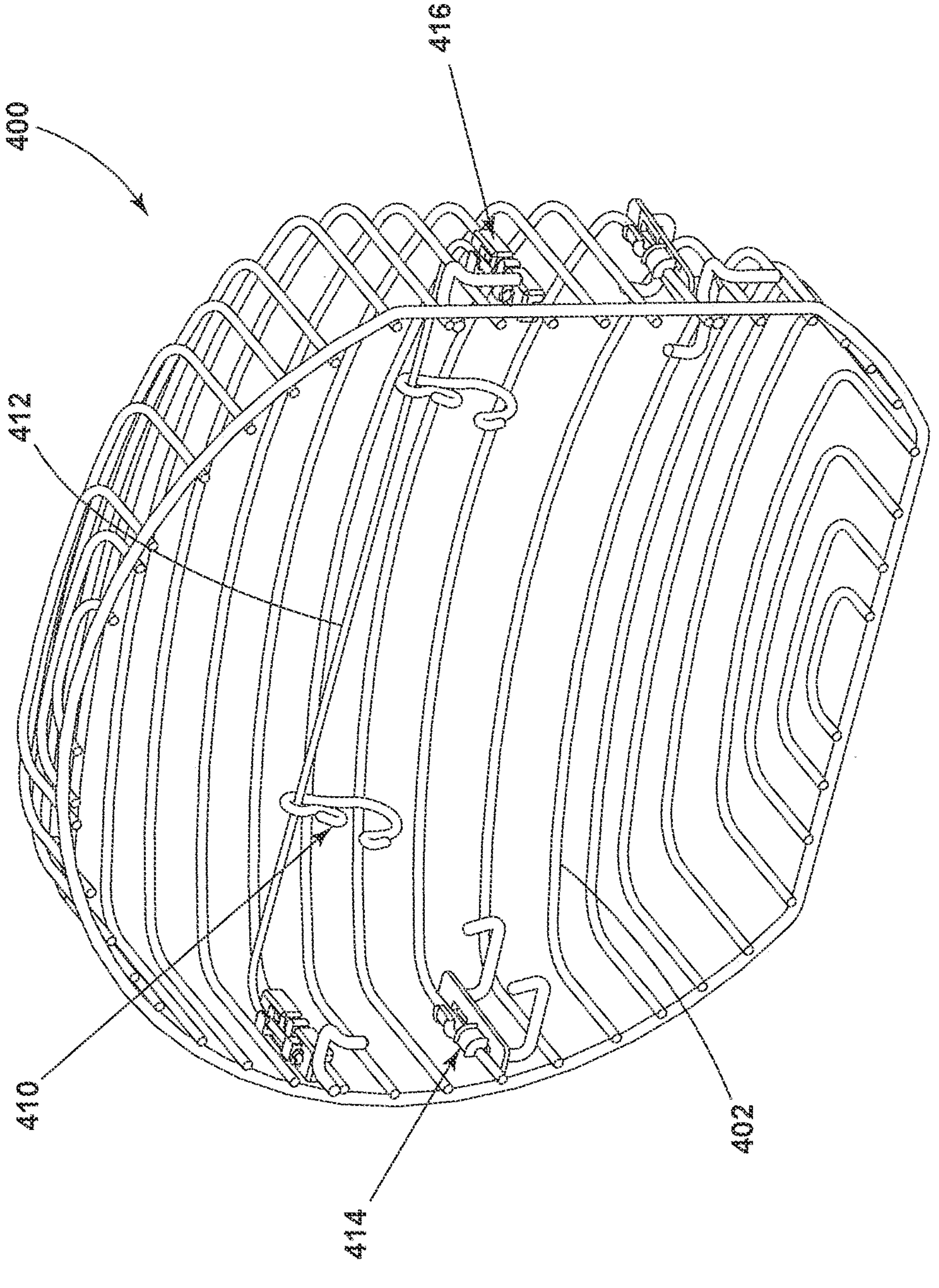
FIG. 7 is a perspective view of an auxiliary drying rack having hanging components according to aspects described herein.

FIG. 7 illustrates an auxiliary drying rack 400 having a plurality of exemplary hanging, resting, or other stationary components. The drying rack 400 can be any drying rack, such as drying rack 100, 200, or 300, or a combination thereof. Non-limiting examples of hanging components can include a J hook 410, a rod 412, a double-hook 414, and clips 416. The rod 412 can be coupled to the drying rack 400 with the clips 416 that are configures to clip onto horizontal rods 402. The J hooks 410 can couple with the rod 412 for example by hanging. The double hook 414 can include a recess that can couple with horizontal rods 402 to couple with the drying rack 400. Resting components may include shelves, wire racks, or other resting surfaces. A user can hang or rest laundry items from the hanging or resting components to organize the laundry items within the drying rack 400 or, can hang or rest laundry items directly from the horizontal rods 402 themselves. The hanging and resting components can be any suitable hanging and resting components for hanging, resting and organizing laundry items within the drying rack 400.

Figure 8:
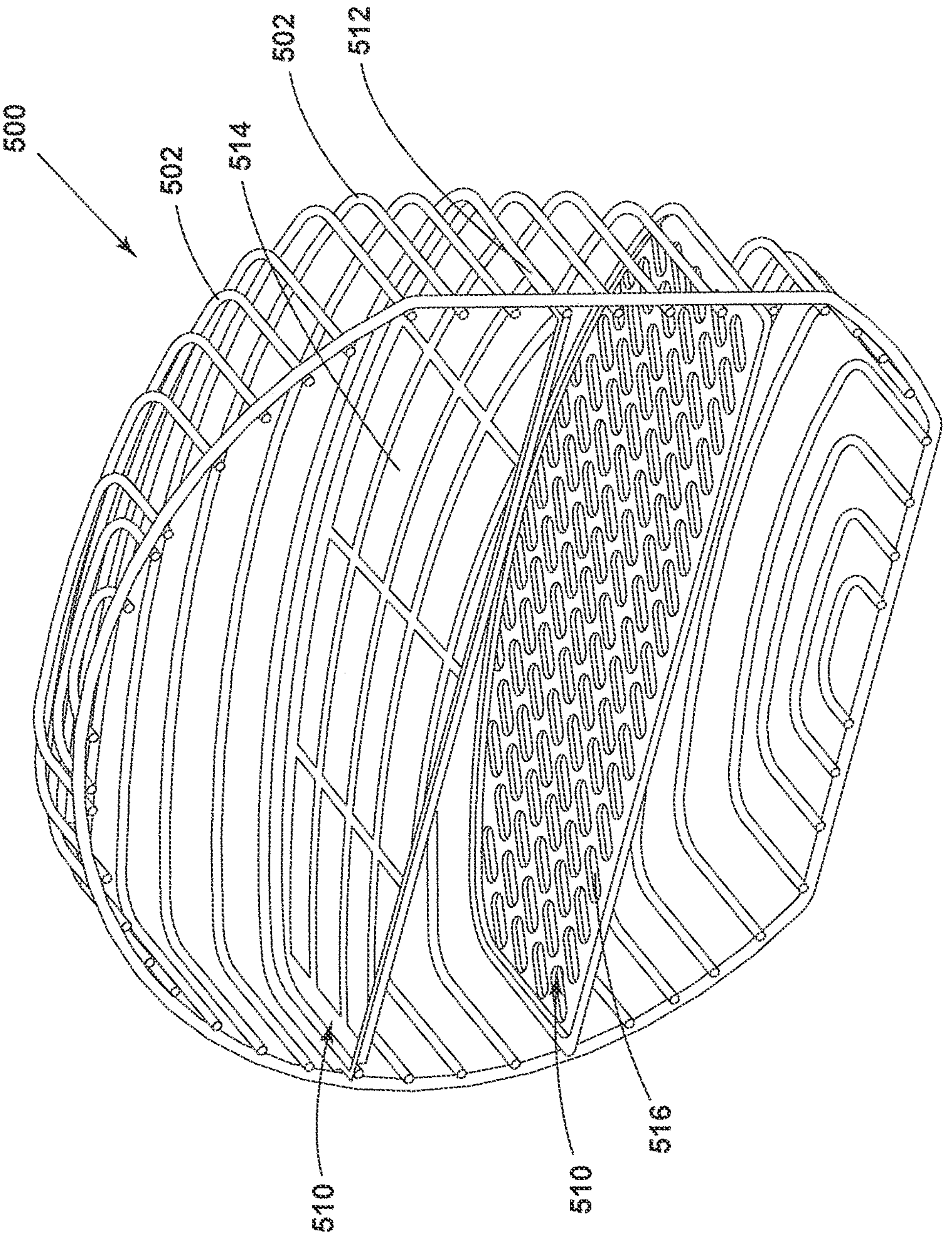
FIG. 8 is a perspective view of an auxiliary drying rack having racks according to aspects described herein.

FIG. 8 illustrates an auxiliary drying rack 500 having a plurality of exemplary shelves or racks 510. The drying rack 500 can be any drying rack, such as drying rack 100, 200, 300, or 400, or a combination thereof. A user can rest laundry items on the racks 510 for drying. The racks 510 can mount on horizontal rods 502 to fit the racks 510 within the drying rack 500. Mounting the racks 510 can include fitting a curved portion 512 of the racks 510 over top of the rods 502 such that the racks 510 rest fixedly on the rods 502. The racks 510 can include apertures 514, 516. Apertures 514, 516 can be of any suitable size and shape. For example, apertures 514 can be larger than apertures 516 where apertures 514 have a generally rectangular shape, and apertures 516 have a generally oval shape. The apertures 514, 516 allow air to pass through to reach the laundry items to be dried that rest on the racks 510.

Figure 9:
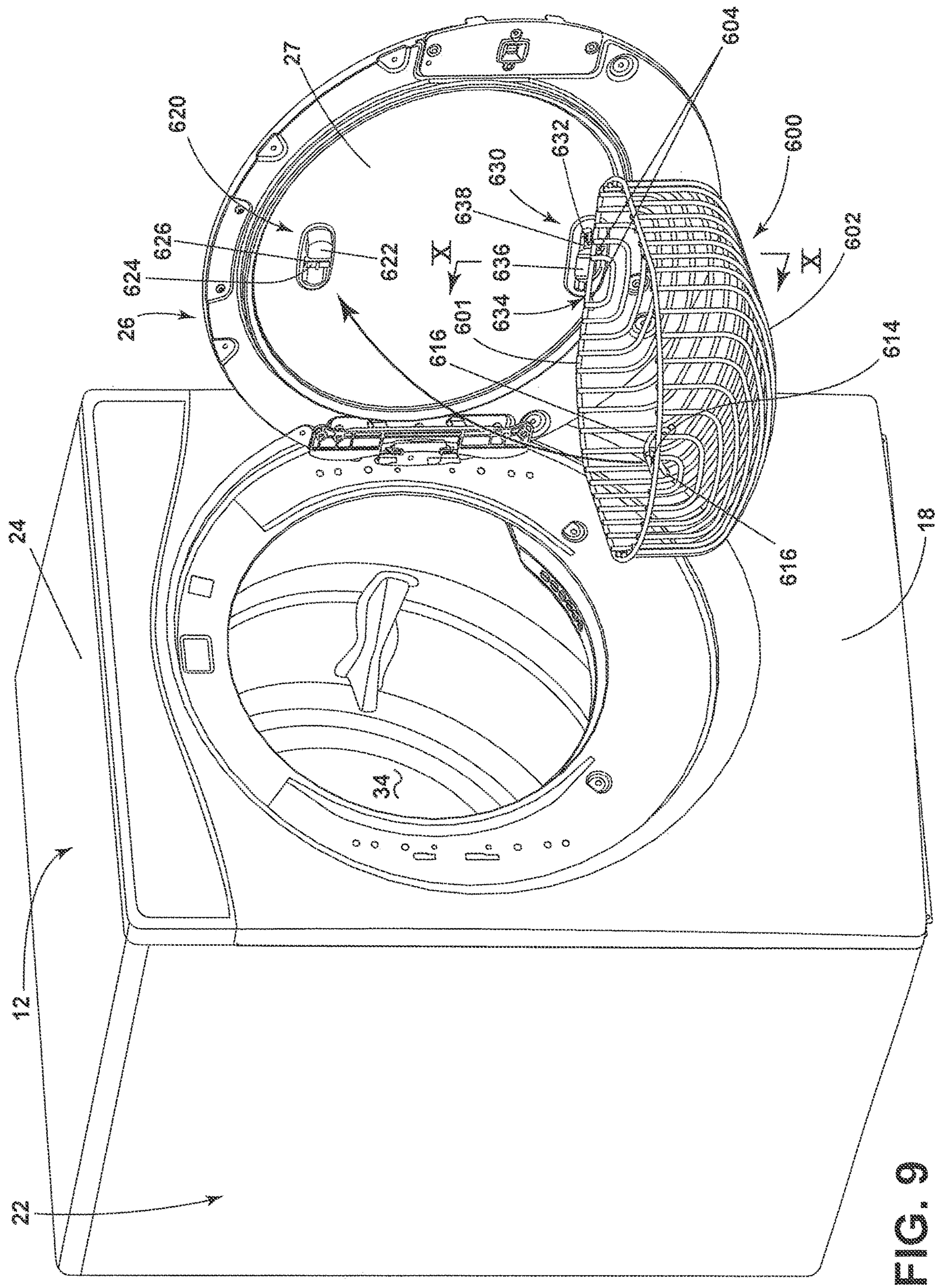
FIG. 9 is a perspective view of an auxiliary drying rack according to aspects described herein.

FIG. 9 illustrates an auxiliary drying rack 600 in an open position according to aspects described herein. Since the auxiliary drying rack 600 is similar to the auxiliary drying rack 200; like parts will be identified with like numerals increased by 400, with it being understood that the description of the like parts of auxiliary drying rack 200 applies to the auxiliary drying rack 600 unless otherwise noted.

Drying rack 600 is similar to drying rack 200 and includes spaced horizontal rods 602. The drying rack 600 is rotatably coupled to the bottom hinge 630 in order for a user to flip the drying rack 600 from the open position, towards the latch 620, as shown by arrow A, for a user to lock the drying rack 600 into a closed position.

The bottom hinge 230 includes a slot 632 to receive a bottom rod 634 of the drying rack 600. The slot 632 can be formed by a lip 636 on the bottom hinge 630. The bottom rod 634 can include a hoop configuration that protrudes from a bottom perimeter 601 of the drying rack 600. The hoop configuration can include substantially vertical rod portions 604 spaced and coupled via the bottom rod 634. The bottom rod 634 can be inserted into the slot 632 where the lip 636 retains the bottom rod 634 and securely and rotatably engages the drying rack 600 with the bottom hinge 630.

Figure 10B:
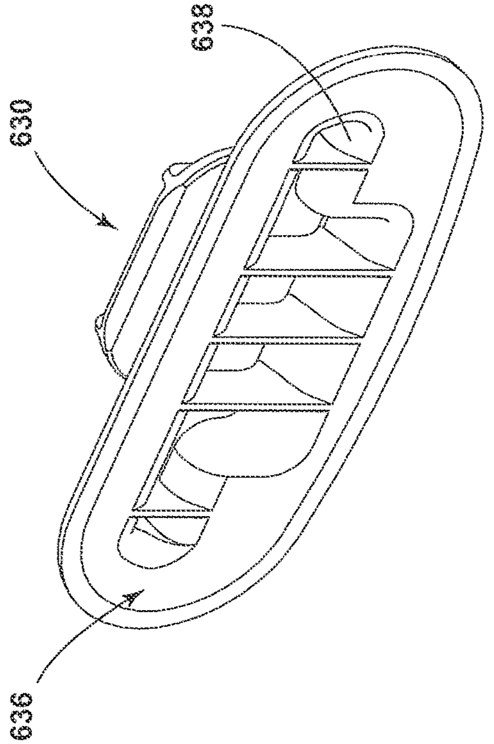
FIG. 10B is a rear view of the hinge of FIG. 10A.
Figure 10A:
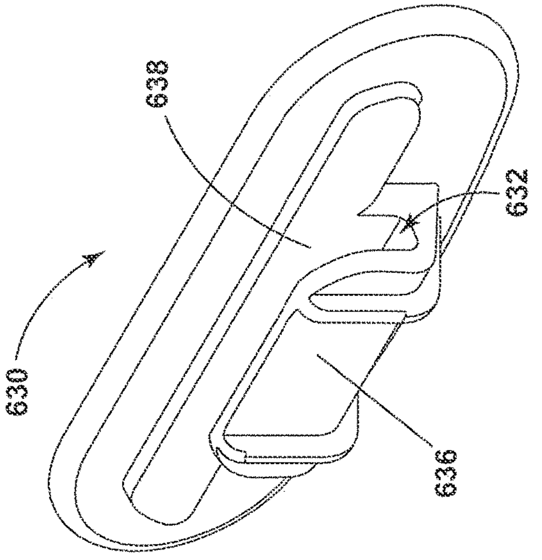
FIG. 10A is a perspective view of a bottom hinge for an auxiliary drying rack according to aspects described herein.

Turning to FIG. 10A, the bottom hinge 630 is more clearly illustrated. An elongated stop 638 can be provided on the bottom hinge 630, behind the lip 636 to prevent the rack 600 from contacting the painted surfaces of door 26. This feature also allows the rack to remain horizontal during the loading and unloading of the items dried in the drying rack 600, which prevents these items from falling out of the drying rack 600 and onto the floor.

The latch 620 can include a stop 622 and a lip 624 that are spaced to form a slot for receiving the pin 614. A spring-biased ramp 626 can be disposed within the stop 622 such that the pin 614 can be inserted into the slot against the ramp 626. When the pin 614 is fully inserted the ramp 626 can retain the pin 614. Additionally, hooks 616 can extend from the pin 614. The hooks 616 can be configured to hang items for use within the drying rack 600.

FIG. 10B illustrates a rear view of the bottom hinge 630. The bottom hinge 630 can includes recesses 638 on a rear surface 636. The bottom hinge 630 can be mounted to the door 26 with an adhesive applied to the rear surface 636. The recesses 638 can prevent adhesive applied to the rear surface 636 from migrating outside of the bottom hinge 630 by allowing the adhesive to flow into the recesses 638.

Figure 10C:
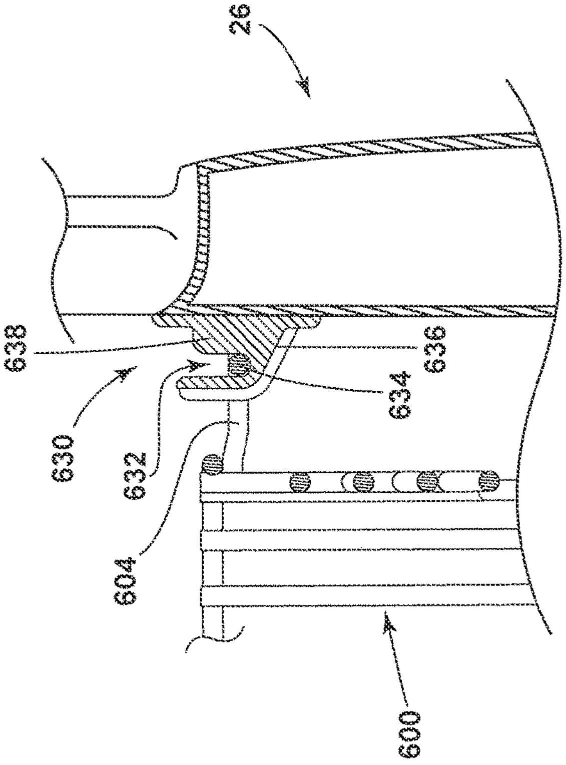
FIG. 10C is a cross-sectional view along ling IV-IV in FIG. 10D.

FIG. 10C more clearly illustrates the slot 632 and the bottom rod 634 with the drying rack 600 in the open position. The bottom rod 634 can be inserted into the slot 632 where the lip 636 retains the bottom rod 634 and securely and rotatably engages the drying rack 600 with the bottom hinge 630 in order to prevent the drying rack 600 from loosely hanging below horizontal.

Figure 11B:
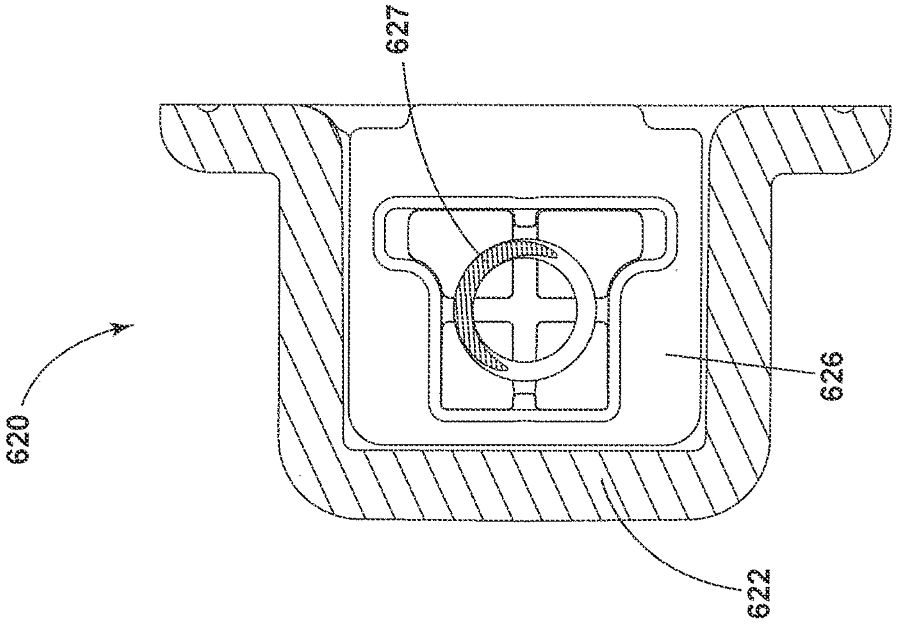
FIG. 11B is a cross-sectional view along line XI-XI in FIG. 11A.
Figure 11A:
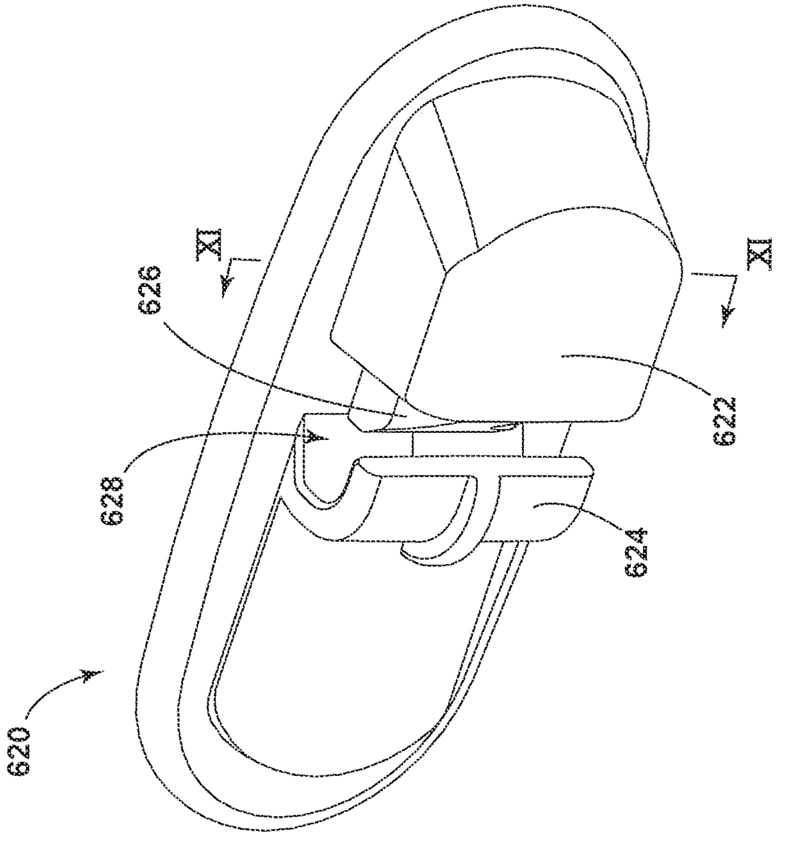
FIG. 11A is a perspective view of a latch for an auxiliary drying rack according to aspects described herein.

Turning to FIG. 11A, the latch 320 is more clearly illustrated. The latch 620 selectively couples the drying rack 600 to the door 26. The slot 628 for receiving the pin 614 (FIG. 9) can be seen best in FIG. 11A. When the pin 614 is fully inserted the ramp 626 can retain the pin 614 by pushing the pin 614 against the lip 624.

FIG. 11B illustrates a cross-sectional view of line XI-XI in FIG. 11A showing a spring 627 within the stop 622. The spring 627 provides a bias for the ramp 626 in order to engage and retain the pin 614 (FIG. 9) within the slot 628.

Benefits of aspects described herein can include an auxiliary drying rack that allows for drying unique or delicate items simultaneously with a standard load of laundry items in the treating chamber. Because the auxiliary drying rack is vertical and in the front of the laundry treating appliance, loading and unloading of the drying rack is simple and the laundry items within the drying rack do not come into contact with drum baffles or lifters. The drying rack is removable such that the user can run a cycle of operation without having the drying rack coupled to the door. Hanging components arrange laundry items within the drying rack to facilitate better exposure of the laundry items to heat, resulting in more efficient and equal drying of the laundry items.

While the invention has been specifically described in connection with certain specific embodiments thereof, it is to be understood that this is by way of illustration and not of limitation, and the scope of the appended claims should be construed as broadly as the prior art will permit. It should also be noted that all elements of all of the claims may be combined with each other in any possible combination, even if the combinations have not been expressly claimed.

We claim:

1. A laundry treating appliance, comprising:
- a cabinet having an interior and defined by a front wall, a rear wall, and a pair of side walls supporting a top wall;
- a rotatable drum disposed within the interior of the cabinet that defines a treating chamber;
- a door mounted vertically to the front wall and selectively moveable between open and closed positions to close an opening in the front wall and having an outer surface and an inner surface where the inner surface faces the treating chamber in the closed position; and
- a drying rack mounted vertically to the inner surface of the door and having an open position and a closed position and extending toward the treating chamber, the drying rack comprising:
  - a plurality of rods defining the drying rack;
  - a hinge positioned on one end of the drying rack for allowing the drying rack to be selectively moveable between open and closed positions, wherein the hinge comprises a slot configured to receive a rod of the plurality of rods defining the drying rack; and
  - a latch positioned at an end of the drying rack opposite the hinge and selectively coupling the drying rack to the door.

2. The laundry treating appliance of claim 1, wherein the plurality of rods are curved to define a dome shaped drying rack.

3. The laundry treating appliance of claim 2 wherein laundry items can be placed in an open end of the drying rack when the drying rack is in the open position and laundry items can be retained within the drying rack by the plurality of rods and the inner surface of the door when the drying rack is in the closed position.

4. The laundry treating appliance of claim 1, wherein the rods are spaced apart to allow airflow into the drying rack.

5. The laundry treating appliance of claim 1, wherein the hinge is located at a bottom of the drying rack and pivotably connect a bottom of the drying rack to the door.

6. The laundry treating appliance of claim 1, wherein the slot is L-shaped.

7. The laundry treating appliance of claim 1, wherein the slot is angled to prevent the rod from disengaging from the slot.

8. The laundry treating appliance of claim 1, wherein the drying rack further comprises a protruding portion that abuts a rack stop on the hinge when the drying rack is in an open position.

9. The laundry treating appliance of claim 8, wherein the protruding portion holds the drying rack at about a 90 degree angle to the door when the drying rack is in the open position.

10. The laundry treating appliance of claim 1, wherein the latch comprises a recessed portion extending outwardly from the latch and a level that is configured to be received within the recessed portion.

11. The laundry treating appliance of claim 10, wherein the level is pivotable mounted to the latch and can rotate in and out of the latch.

12. The laundry treating appliance of claim 11, wherein the drying rack further comprises a pin receivable within a recessed portion of the latch.

13. The laundry treating appliance of claim 12, wherein the pin is received within the recessed portion of the latch and the level is rotated in the recessed portion of the latch, the latch is in a locked position and holds the pin in place.

14. The laundry treating appliance of claim 12, wherein the drying rack has an outer surface extending into the treating chamber when the door is in the closed position.

15. A laundry treating appliance, comprising:

a cabinet having an interior and defined by a front wall, a rear wall, and a pair of side walls supporting a top wall;

a rotatable drum disposed within the interior of the cabinet that defines a treating chamber;

a door mounted to the front wall and selectively moveable between an open and closed position to close an opening in the front wall and having an outer surface and an inner surface where the inner surface faces the treating chamber in the closed position; and a drying rack defined by a plurality of rods and mounted to the inner surface of the door and selectively moveable by a hinge between an open position for receiving laundry items and a closed position for retaining laundry items in the drying rack during a cycle of operation and having an outer surface extending into the treating chamber when the door is in the closed position.

16. The laundry treating appliance of claim 15, wherein the plurality of rods are curved to define a dome shaped drying rack.

17. The laundry treating appliance of claim 15, wherein the hinge is located at the bottom of the drying rack and pivotably connects a bottom of the drying rack to the door.

18. The laundry treating appliance of claim 15, wherein the hinge comprises a slot configured to receive a rod of the plurality of rods defining the drying rack.

19. The laundry treating appliance of claim 18, wherein the slot is angled to prevent the rod from inadvertently disengaging from the slot.

* * * * *